ized Patent

United States Patent [19]
Evans et al.

[11] Patent Number: 4,492,786
[45] Date of Patent: Jan. 8, 1985

[54] MODIFIED ORGANOPOLYSILOXANE COMPOSITION

[75] Inventors: Edwin R. Evans, New York; Robert F. Clark, Saratoga, both of N.Y.

[73] Assignee: General Electric Company, Waterford, N.Y.

[21] Appl. No.: 527,298

[22] Filed: Aug. 26, 1983

[51] Int. Cl.³ ............................................. C08L 83/04
[52] U.S. Cl. ................................... 524/865; 524/860; 524/588; 525/101; 525/479; 528/24; 528/32; 528/33; 528/34
[58] Field of Search ...................... 524/860, 865, 588; 525/479, 101; 528/24, 32, 33, 34

[56] References Cited

U.S. PATENT DOCUMENTS

| | | | |
|---|---|---|---|
| 2,958,707 | 11/1960 | Warrick | 260/448.2 |
| 3,050,492 | 8/1962 | Polmanteer et al. | 524/588 |
| 3,070,573 | 12/1962 | Beck | 260/45.4 |
| 3,178,464 | 4/1965 | Pierpoint | 260/448.2 |
| 3,179,619 | 4/1965 | Brown | 528/32 |
| 3,198,766 | 8/1965 | Nitzsche et al. | 260/46.5 |
| 3,436,252 | 4/1969 | Neuroth | 117/155 |
| 3,555,109 | 9/1967 | Getson | 260/825 |
| 3,565,851 | 2/1971 | Neuroth | 260/37 |
| 3,627,836 | 10/1971 | Getson | 260/825 |
| 3,631,087 | 12/1977 | Lewis et al. | 260/448.2 |
| 3,661,816 | 5/1972 | Pepe et al. | 525/479 |
| 3,694,478 | 9/1972 | Adams et al. | 260/448.2 |
| 3,770,847 | 11/1973 | Lengnick | 260/827 |
| 3,794,694 | 2/1974 | Chadha et al. | 260/827 |
| 3,825,618 | 7/1974 | Pepe | 260/827 |
| 3,829,529 | 8/1974 | Lengnick | 260/827 |
| 3,975,362 | 8/1976 | Kim et al. | 528/24 |
| 4,032,499 | 6/1977 | Kreuzer et al. | 525/479 |
| 4,166,078 | 8/1979 | Getson | 528/26 |
| 4,172,101 | 10/1979 | Getson | 525/101 |
| 4,347,336 | 8/1982 | Homan et al. | 528/32 |
| 4,360,610 | 11/1982 | Murray et al. | 524/588 |

Primary Examiner—Melvyn I. Marquis
Attorney, Agent, or Firm—Hedman, Gibson, Costigan & Hoare

[57] ABSTRACT

Curable fluorosilicone compositions are disclosed comprising a grafted organopolysiloxane, a vinyl-functional crosslinking agent, and a free-radical initiator. Judicious compounding and control of grafting and curing variables provides an assortment of products ranging in properties from elastomeric to thermoplastic.

32 Claims, No Drawings

MODIFIED ORGANOPOLYSILOXANE COMPOSITION

FIELD OF THE INVENTION

The present invention relates to curable compositions comprising grafted organopolysiloxanes which form a variety of elastomeric products. More particularly, the compositions of the present invention include a class of organopolysiloxanes grafted with unsaturated fluorocarbons which are curable in the presence of a vinyl-containing crosslinking agent and a free-radical initiator to form polymeric solids having properties which range from thermoplastic to elastomeric.

BACKGROUND OF THE INVENTION

Grafted organopolysiloxanes prepared by reacting olefinic monomers with organopolysiloxanes to form tough coating compositions, paper release compositions, lubricants, sealants, and the like are known and described in such patents as U.S. Pat. No. 3,430,252 and U.S. Pat. No. 3,565,851 (Neuroth), U.S. Pat. No. 3,631,087 and U.S. Pat. No. 3,694,478 (Adams et al.), U.S. Pat. No. 2,958,707 (Warrick), and U.S. Pat. No. 4,166,078 and U.S. Pat. No. 4,172,101 (Getson), all of which are hereby incorporated by reference.

It has now been discovered that a class of organopolysiloxanes grafted with $C_2$-$C_3$ unsaturated fluorocarbons, such as vinylidene fluoride ($CH_2$=$CF_2$), can be combined with a vinyl-containing crosslinking agent and a free-radical initiator to form a curable composition having a unique range of properties, depending on the amount of fluorocarbon grafting. After curing, polymeric materials varying in forms from thermoplastic to elastomeric, and having improved mechanical properties and solvent resistance, are obtained.

SUMMARY OF THE INVENTION

Accordingly, it is an object of the present invention to provide new curable fluorosilicone polymers.

It is a further object of the present invention to provide fluoro-elastomers having improved mechanical properties and improved resistance to ether and ketone solvents.

It is a further object of the present invention to provide an organopolysiloxane elastomeric gum utilizing a grafted organopolysiloxane with variable amounts of fluorocarbon grafting which may be compounded and cured to display properties that vary with the fluorocarbon content, the molecular weight distribution, and the structural configuration of the polymer chain.

These and other objects are accomplished herein by a curable fluorosilicone composition comprising:

(A) an organopolysiloxane having terminal groups selected from the class consisting of —H, —OH, —R, —OR, and —CH=CH$_2$, and pendant groups, bonded directly to silicon, selected from —R' and —R'—R" groups, wherein R is a monovalent hydrocarbon radical of from 1 to 8 carbon atoms free of aliphatic unsaturation, R' is a monovalent hydrocarbon or halo-hydrocarbon radical of from 1 to 8 carbon atoms, and R" is a monomeric or polymeric group derived from an unsaturated fluorocarbon, or mixture of unsaturated fluorocarbons, having 2 or 3 carbon atoms and up to 6 fluorine atoms grafted to the organic radicals represented by R', said organopolysiloxane having at least one pendant —R'—R" group;

(B) a vinyl-functional crosslinking agent; and (C) a free-radical initiator capable of promoting crosslinking between components (A) and (B), above.

Also contemplated are the use of optional ingredients, such as fillers and cure inhibitors, and a process for preparing the compositions of the present invention.

DETAILED DESCRIPTION OF THE INVENTION

The compositions of the present invention are prepared by reacting an unsaturated fluorocarbon, such as vinylidene fluoride ($CH_2$=$CF_2$), with an organopolysiloxane to yield a grafted organopolysiloxane gum having monomeric or polymeric side-chains derived from the fluorocarbon, and then compounding the gum with a vinyl-functional crosslinking agent and a free-radical initiator capable of promoting crosslinking between the vinyl groups and the grafted polymer.

The organopolysiloxane starting materials contemplated in this invention are well known. Their configuration is typically a siloxane chain having an average of two pendant organic groups bonded to each silicon atom and terminal groups such as hydrogen, hydroxy, alkyl, alkoxy, vinyl, etc.

The preferred organopolysiloxane starting materials which are reacted with unsaturated fluorocarbons have the general formula:

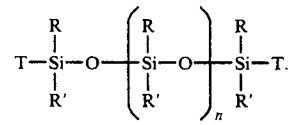

in which T is a terminal group selected from H, OH, R, OR, and vinyl, where R is a monovalent hydrocarbon radical of from 1 to 8 carbon atoms free of aliphatic unsaturation; R' is a monovalent hydrocarbon radical of from 1 to 8 carbon atoms selected from alkyl, cycloalkyl, aryl, alkoxy, cycloalkoxy and aryloxy groups or halohydrocarbon groups such as halogen-substituted alkyl, alkoxy, aryl, aryloxy, etc.; and n is an integer of from 10 to 3700. Methyl or hydroxy are preferred for T in the above formula; lower alkyl such as methyl, ethyl, etc. or fluorinated alkyl, such as perfluoroalkyl, are preferred for R'. Most preferred for T and R is methyl; the most preferred polysiloxane starting material, therefore, is a trimethylsiloxy-chainstopped polydimethylsiloxane.

Monomeric or polymeric side-chains derived from unsaturated fluorocarbons are grafted onto the pendant R' groups via a hydrogen abstraction reaction. Preferred grafted polymers will thus have the general formula:

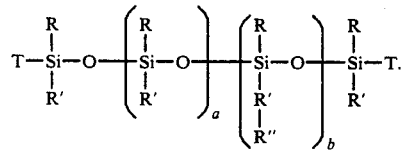

in which T and R and R' are as defined above, and the —R'—R" group is derived from a hydrogen abstraction (or possibly a halogen abstraction, in the case of a halohydrocarbon pendant group) from the pendant R' group and polymerization with the fluorocarbon. R" is therefore a monomeric or polymeric side-chain derived from unsaturated fluorocarbon, forming fluorocarbon chains of varying lengths, and varying degrees of fluorination (depending on the exact unsaturated fluorocarbon or mixture used), which are connected to silicon through a hydrocarbon or halo-hydrocarbon bridge derived from R'. a and b are positive integers, and a+b is equal to from 10 to 3700.

The unsaturated fluorocarbons suitable for producing the grafted side-chains of the grafted polymers of the present invention are fluorocarbons of 2 to 3 carbon atoms containing 1 unsaturated site, that is, they are derivatives of ethene or propene having from 1 to 6 total fluorine atoms. Preferred unsaturated fluorocarbons will have 1 to 4 fluorine atoms; and compounds having 5 or 6 fluorines, such as perfluoropropene, will ordinarily be used in admixture with less fluorinated compounds. Mixtures of unsaturated fluorocarbons are also contemplated. Most preferred for the purposes herein is vinylidene fluoride ($CH_2=CF_2$).

The type of free-radical initiated abstraction described above is most effectively carried out in the presence of a free-radical initiator, especially organic peroxides. Small amounts, such as about 0.01% by weight of the more active peroxide initiators is sufficient to initiate the desired reaction. Greater amounts, such as up to about 5.0% or more of the initiator may be used, however amounts in excess of about 1.5% by weight may promote coupling reactions which increase the viscosity of the reaction mixture.

The most suitable peroxide initiators are compounds of the formula, ROOH or ROOR in which R is an organic radical, especially those compounds in which at least one peroxide oxygen is attached to a tertiary carbon atom. Preferred such initiators include t-butyl hydroperoxide, cumene hydroperoxide, decaline hydroperoxide, di-t-butyl peroxide, dicumyl peroxide, 2,5-dimethyl-2,5-di-(t-butyl peroxy)hexane; also cyclic peroxides such as ascaridole and 1,5-dimethylhexane-1,5-peroxide, peresters such as t-butylperbenzoate, t-butylperoxyisopropylcarbonate and t-butyl peroctoate, and ketone peroxides such as acetone peroxide and cyclohexanone peroxide. Acyl peroxides, aryl peroxides and peracids may also be used to effect the grafts, however they will generally result in lower yields of the grafted product. The peroxides containing tertiary alkoxy radicals have been found to be more efficient in abstracting hydrogen (or halogen) atoms from the pendant organic groups linked to the silicon atoms, and they are therefore preferred.

The temperatures of the polymerization is not critical, but it has been found that reaction temperatures above about 160° C. provide grafted polymers having inferior properties. Consequently, it is preferred that the polymerization be carried out at temperatures below about 150° C., preferably at from about 50° C. to about 140° C.

The chain length of the parent polysiloxane (i.e., molecular weight) will affect the properties of the grafted polymer and curable compositions made therewith. Molecules of short chain length are expected to contain many ungrafted units, and molecules of extremely long chain length will exhibit extensive grafting and may be very viscous. Also, irregularities along the siloxane polymer chain will affect the degree of crystallinity, and many properties, for example solvent resistance, will be affected by the weight percent of fluorocarbon content. For these reasons, control of such factors as initiator concentration, reaction time and temperature, fluorocarbon content, molecular weight distribution, and irregularities along the siloxane chain will determine the specific properties of the grafted polymer product. Judicious regulation of processing variables will allow the practitioner to tailor the compositions prepared according to the present invention to his individual needs.

It is also preferred that the grafting be carried out in a substantially oxygen-free environment because of the free-radical nature of the reaction. This can be accomplished by purging the reaction vessel with an inert gas such as nitrogen.

The proportion of unsaturated fluorocarbon used in the grafting operation may be varied within wide limits, depending on the specific properties desired. For example, polydimethylsiloxanes with viscosities ranging from 30,000 to 600,000 centipoise, when grafted with vinylidene fluoride over a range of 7-25 weight percent using di-t-butyl peroxides (i.e., 0.5-1.5 weight percent based on the molecular weight of the parent polymer), yield tough elastomeric gums having specific gravities in the range of about 1.01 to about 1.3 at room temperature. The gums derived from grafting of the lower molecular weight polysiloxanes are solvent soluble in dimethylacetamide or dimethylformamide, while those obtained from higher molecular weight species tend to be non-soluble.

The grafted products are mixtures of grafted polymer, polymerized homopolymer, residual ungrafted starting materials, and possibly some gel. Unfilled gums are clear and in general have a faint yellow tint, however optical clarity is also noted in cured compounds containing 60 weight percent filler. Grafted copolymers containing from about 7.0 to about 80 weight percent vinylidene fluoride are expected to display increasing mechanical and solvent resistance properties with increasing molecular weight. It is also believed that grafted organopolysiloxanes are less permeable to gases than, for instance, ungrafted polydimethylsiloxanes.

As discussed above, the curable fluorosilicone compositions according to the present invention are prepared by admixing a grafted organopolysiloxane with a vinyl-functional cross-linking agent and a curing catalyst that will promote polymerization between the grafted polymer and the crosslinking agent.

The vinyl-containing crosslinking agent can be any monomeric or polymeric compound containing ethylenic unsaturation which will cross-polymerize, or cure, with the grafted organopolysiloxanes described previously. For the purposes of the present invention, vinyl-functional polysiloxanes are preferred. Such polysiloxanes will consist of from 0.5 to 100 weight percent vinyl-containing siloxane units of the general formula $(CH_2=CH)R^3{}_a SiO_{3-a/2}$, wherein $R^3$ is a monovalent hydrocarbon or monovalent halo-hydrocarbon radical and a has a value of from 0 to 2, and any non-vinyl-containing siloxane units having the formula $R^4{}_b SiO_{4-b/2}$, wherein $R^4$ is a monovalent hydrocarbon or halo-hydrocarbon radical and b has a value of from 0 to 3.

These vinyl-functional siloxanes can range anywhere from low molecular weight fluids such as vinyl methyl cyclotetrasiloxane to high molecular weight gums having a molecular weight of one million or more. In the foregoing formula $R^3$ can be any monovalent hydrocarbon or halo-hydrocarbon radical, including alkyl groups such as methyl, ethyl, propyl, butyl, etc., alkenyl groups such as vinyl, allyl, hexenyl, etc., aryl groups such phenyl or naphthyl, aralkyl groups, alkaryl groups, alkynyl groups, and the like. $R^3$ can also be any of the corresponding halogenated hydrocarbon radicals such a chloromethyl, chloropropyl, chlorophenyl, 3,3,3-trifluoropropyl, and the like. $R^3$ preferably contains from 1 to 20 carbon atoms.

The non-vinyl-containing units of the vinyl-functional polysiloxanes will have the general formula $R^4{}_b SiO_{4-b/2}$, in which $R^4$ can be selected from the same class of hydrocarbon or halo-hydrocarbon radicals described above for $R^3$.

Most preferred for the purposes herein will be vinyl-functional siloxane crosslinking agents selected from the group consisting of dimethylvinyl-chainstopped linear polydimethylsiloxanes, dimethylvinyl-chain-stopped polydimethyl-methylvinylsiloxane copolymer, vinyl methyl cyclotetrasiloxane (i.e., tetravinyltetramethylcyclotetrasiloxane, or methylvinyltetramer), tetramethyldivinyldisiloxane, and mixtures of these compounds.

The crosslinking, or curing, reaction between the grafted organopolysiloxane and the vinyl-functional components of the present compositions involves the same mechanism of hydrogen abstraction and polymerization as in the grafting operation; consequently, the crosslinking catalyst component (C) in the curable compositions of the present invention is selected from the previously described class of free-radical initiators, with the same preference for tertiary alkoxy radical-containing peroxides, as in the grafting reaction. The amount of catalyst used is not critical, so long as the desired degree of crosslinking is effected. As with any catalyst, it is usually desirable to employ the least effective amount, however, for curing, by way of illustration, an amount of peroxide catalyst of from about 0.01 to 5 weight percent, based on the total composition, is believed to give excellent cure. Simple experimentation to arrive at the most suitable catalyst level is contemplated, and to the extent that the character of the reaction desired by the practitioner will differ between the grafting operation and the curing operation, the amount and choice of initiator will also change.

The compositions obtained by mixing the three basic ingredients of the invention, i.e. grafted polymer, crosslinking agent and crosslinking initiator, can be vulcanized at temperatures as low as room temperature up to about 150° C. The time required for vulcanization can vary over wide limits, depending upon the particular reactants, their proportions and reaction temperature. In general the rate of reaction increases with temperature and amount of initiator present.

Where it is desired to store the curable composition for long periods, inhibitors may be added to effectively raise the temperature at which crosslinking will occur. Otherwise, the composition may be stored as a two-package system, in which the grafted organopolysiloxane is stored separately from the combined crosslinking agent and initiator.

Also contemplated herein are the addition of conventional additives such as dyes, pigments, and fillers, especially fumed silica, treated silica, and silica aerogels, and the like.

In order that persons skilled in the art may better understand the practice of the present invention, the following examples are provided by way of illustration, and not by way of limitation.

EXAMPLE A

Grafted Polymer A 500 parts by weight of a trimethyl terminal polydimethylsiloxane fluid, molecular weight 14,000, viscosity 300,000 cps, were placed in a stainless steel reaction vessel with 5.0 parts by weight of di-t-butylperoxide. The vessel was closed and charged with 55 parts by weight of liquid vinylidene fluoride using pressurized nitrogen gas to force the charge into the vessel. The mixture was heated to 120° C. for 18–19 hours. An exotherm up to 135° C. was observed which gradually subsided; the internal pressure of the vessel reached 860 psi before diminishing to 100 psi after 18 hours. The vessel was cooled to room temperature and vented. The grafted polymer product was first washed with methanol three times, followed by distilled water (two times), and finally methanol (once). To yield 541 parts by weight (97.5% yield based on total charge) of a clear gum having a specific gravity of 1.0153 at 25° C. and a vinylidene fluoride content of 7.6 weight percent (based on the parent polymer).

The gum required a hot mill (140 psi steam pressure) for banding and compounding into the following composition at 3 filler loadings:

| COMPOSITIONS 1–3 | |
|---|---|
| Graft Polymer A | 70 parts by weight |
| Filler* | 20, 40 and 60 parts by weight, respectively. |
| Crosslinking agent 1** | 1.0 parts by weight |
| Crosslinking agent 2*** | 2.0 parts by weight |
| 2,5-dimethyl-2,5-di-(t-butyl peroxy)hexane[4] | 2.0 parts by weight |

*Fumed silica (Cab-O-Sil ®; Cabot Corp.) treated with octamethylcyclotetrasiloxane.
**Vinyl terminal dimethyl-methylvinylsiloxane copolymer, 13¼ mole % vinyl functionality.
***Vinyl terminal polydimethylsiloxane oil.
[4]Lupersol ® 101 (Pennwalt Corp.).

The compositions were cured 20 minutes at 370° F. and then post baked 30 minutes at 400° F. The following physical properties were observed:

| Physical Properties of Compositions 1,2 & 3 | | | |
|---|---|---|---|
| | Filler Loading | | |
| | 20 | 40 | 60 |
| Shore A | 31 | 47 | 61 |
| 100% Modulus, psi | 100 | 226 | 365 |
| Tensile, psi | 245 | 630 | 735 |
| Elongation, % | 250 | 310 | 280 |
| Die B Tear, lbs. | 80 | 245 | 275 |
| Sp. Grav. at 25° C. | 1.095 | — | 1.219 |
| % Vol. Swell 22 hrs Fuel B/rt | 399 | 284 | 250.6 |

Additional reinforcement is observed with increasing filler content; however there is no drop in tensile or tear strength observed at a loading greater than 40 parts by weight.

EXAMPLE B

Grafted Polymer B

A second grafted organopolysiloxane was prepared in the same fashion as graft polymer A except that a higher molecular weight trimethyl terminal polydimethylsiloxane (600,000 cps) was employed. Curable compositions were prepared at filler loadings of 20 and 40 parts by weight, as follows:

| Compostitions 4 & 5 | |
| --- | --- |
| Graft Polymer B | 70 parts by weight |
| Filler | 20 and 40 parts by weight, respectively |
| Crosslinking agent 1 | 1.0 parts by weight |
| Crosslinking agent 2 | 2.0 parts by weight |
| 2,5-dimethyl-2,5-di-(t-butyl peroxy)hexane | 2.0 parts by weight |

After curing 20 minutes at 370° F. and post baking 30 minutes at 400° F., the following properties were observed:

| Physical Properties of Compositions 4 & 5 | | |
| --- | --- | --- |
| | Filler Loading | |
| | 20 | 40 |
| Shore A | 32 | 51 |
| 100% Modulus, psi | 115 | 280 |
| Tensile, psi | 290 | 690 |
| Elongation, % | 220 | 290 |
| Die B Tear, lbs. | 110 | 287 |
| Sp. Grav. at 25° C. | 1.098 | 1.180 |
| % Vol. Swell 22 hrs Fuel B/rt | 344 | 237 |

EXAMPLE C

A trimethyl terminal trifluoropropyl-methyl siloxane homopolymer (10,000 cps) was grafted with vinylidene fluoride in the same manner as in Examples A and B to yield a grafted fluorosilicone gum containing 23.9 weight percent vinylidene fluoride having a specific gravity of 1.396 at 25° C. The polymer was soluble (1% solution) in both dimethylacetamide and dimethylformamide.

Modifications and variations in the present invention are obviously possible in light of the foregoing disclosure. It is understood, however, that any such incidental changes made in the particular embodiments of the invention are within the full intended scope of the appended claims.

What is claimed is:

1. a curable fluorosilicone composition comprising:
   (A) an organopolysiloxane having terminal groups selected from the class consisting of —H, —OH, —R, —OR, and —CH=CH$_2$, and pendant groups, bonded directly to silicon, selected from —R, —R' and —R'—R" groups, wherein R is a monovalent hydrocarbon radical of from 1 to 8 carbon atoms free of aliphatic unsaturation, R' is a monovalent hydrocarbon or halo-hydrocarbon radical of from 1 to 8 carbon atoms, and R" is a monomeric or polymeric group grafted to said R' group and derived from an unsaturated fluorocarbon or mixture of unsaturated fluorocarbons having 2 or 3 carbon atoms and up to 6 fluorine atoms grafted to the organic radicals represented by R', said organopolysiloxane having at least one pendant —R'—R" group;
   (B) a vinyl-functional polymeric crosslinking agent; and
   (C) a free-radical initiator capable of promoting crosslinking between components (A) and (B), above.

2. A curable composition as defined in claim 1, wherein the organopolysiloxane component (A) has the formula:

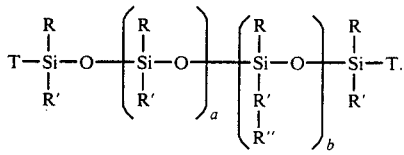

wherein T represents a terminal group, a and b are positive integers, and a+b is equal to from 10 to 3700.

3. A curable composition as defined in claim 2, wherein the free-radical initiator component (C) is an organic peroxide.

4. A curable composition as defined in claim 3, wherein said organic peroxide initiator contains at least one tertiary alkoxy radical.

5. A curable composition as defined in claim 4, wherein said peroxide initiator is selected from the group consisting of t-butyl hydroperoxide, cumene hydroperoxide, decaline hydroperoxide, di-t-butyl peroxide, dicumyl peroxide, 2,5-dimethyl-2,5-di-(t-butyl peroxy)hexane, ascaridole, 1,5-dimethylhexane-1,5-peroxide, t-butylperbenzoate, t-butylperoxyisopropylcarbonate and t-butyl peroctoate.

6. A curable composition as defined in claim 4, wherein the vinyl-functional crosslinking agent (B) is a polysiloxane consisting of from 0.5 to 100 weight percent vinyl-containing siloxane units having the formula (CH$_2$=CH)R$^3_a$SiO$_{3-a/2}$, wherein R$^3$ is a monovalent hydrocarbon or monovalent halo-hydrocarbon radical and a has a value of from 0 to 2, any non-vinyl-containing siloxane units having the formula R$^4_b$SiO$_{4-b/2}$, wherein R$^4$ is a monovalent hydrocarbon or halo-hydrocarbon radical and b has a value of from 0 to 3.

7. A curable composition as defined in claim 6, wherein said vinyl-functional crosslinking agent is selected from the group consisting of dimethylvinyl-chainstopped linear polydimethylsiloxane, dimethylvinyl-chainstopped polydimethyl-methylvinylsiloxane copolymer, vinyl methyl cyclotetrasiloxane, tetramethyldivinyldisiloxane, and mixtures thereof.

8. A curable composition as defined in claim 6, wherein said peroxide initiator is present in an amount of from about 0.01 to 5 weight percent, based on the total composition.

9. A curable composition as defined in claim 2, wherein said unsaturated fluorocarbon contains from 1 to 4 fluorine atoms per molecule.

10. A curable composition as defined in claim 9, wherein the unsaturated fluorocarbon is vinylidene fluoride.

11. A curable composition as defined in claim 10, wherein the free-radical initiator component (C) is an organic peroxide.

12. A curable composition as defined in claim 11, wherein said organic peroxide initiator contains at least one tertiary alkoxy radical.

13. A curable composition as defined in claim 12, wherein said peroxide initiator is selected from the group consisting of t-butyl hydroperoxide, cumene hydroperoxide, decaline hydroperoxide, di-t-butyl peroxide, dicumyl peroxide, 2,5-dimethyl-2,5-di-(t-butyl peroxy)hexane, ascaridole, 1,5-dimethylhexane-1,5-peroxide, t-butylperbenzoate, t-butylperoxyisopropylcarbonate and t-butyl peroctoate.

14. A curable composition as defined in claim 13, wherein said vinyl-functional crosslinking agent is selected from the group consisting of dimethylvinyl-chainstopped polydimethyl-methylvinylsiloxane copolymer, vinyl methyl cyclotetrasiloxane, tetramethyldivinyldisiloxane, and mixtures thereof.

15. A curable composition as defined in claim 14, wherein the grafted —R″ groups comprise from about 7 to 25 weight percent of said organopolysiloxane component (A), and said organopolysiloxanes have a specific gravity in the range of about 1.01 to about 1.3 at room temperature.

16. A curable composition as defined in claim 1, which contains the additional component (D) of a filler selected from fumed silica, treated silica, and silica aerogel.

17. A curable composition as defined in claim 16, wherein said filler is fumed silica treated with octamethylcyclotetrasiloxane.

18. A process for preparing a curable fluorosilicone composition comprising the steps:
   (A) reacting (i) an organopolysiloxane having an average of two pendant monovalent hydrocarbon or halohydrocarbon groups of from 1-8 carbon atoms bonded to each silicon atom and terminal groups selected from hydrogen, hydroxyl, alkyl, alkoxy and vinyl of from 1-8 carbon atoms, with (ii) an unsaturated fluorocarbon or mixture of unsaturated fluorocarbons having 2 to 3 carbon atoms and up to 6 fluorine atoms in the presence of an organic peroxide initiator at a temperature of from about 50° C. to about 140° C.; and
   (B) combining the reaction product with (iii) a vinyl-functional polymeric crosslinking agent, and (iv) an organic peroxide initiator.

19. The process of claim 18, wherein said organopolysiloxane has the formula

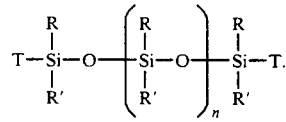

wherein T is selected from the group consisting of hydrogen, hydroxy, monovalent hydrocarbon or oxyhydrocarbon radicals of from 1 to 8 carbon atoms free of aliphatic unsaturation and vinyl; R is a monovalent hydrocarbon of from 1 to 8 carbon atoms; R' is a monovalent hydrocarbon or halo-hydrocarbon radical of from 1 to 8 carbon atoms; and n is an integer of from 10 to 3700.

20. The process of caim 19, wherein said unsaturated fluorocarbon has from 1 to 4 fluorine atoms.

21. The process of claim 20, wherein said unsaturated fluorocarbon is vinylidene fluoride.

22. The process of claim 21, wherein said organopolysiloxane is a trimethylsiloxy-chainstopped polydimethylsiloxane.

23. The process of claim 21, wherein said organopolysiloxane contains fluorohydrocarbon pendant groups.

24. The process of claim 23, wherein said organopolysiloxane is a trimethylsiloxy-endstopped trifluoropropyl-methyl siloxane homopolymer.

25. The process of claim 22, wherein said polydimethylsiloxane has a viscosity ranging from 30,000 to 600,000 cps, sufficient vinylidene fluoride is reacted to result in a range of about 7 to 25 weight percent vinylidene fluoride in the reaction product, and said organic peroxide initiator is a di-t-butyl peroxide.

26. A curable fluorosilicone composition prepared by:
   (A) reacting (i) an organopolysiloxane having an average of two pendant monovalent hydrocarbon or halohydrocarbon groups of from 1-8 carbon atoms bonded to each silicone atom and terminal groups selected from hydrogen, hydroxyl, alkyl, alkoxy and vinyl of from 1-8 carbon atoms, with (ii) an unsaturated fluorocarbon or mixture of unsaturated fluorocarbons having 2 or 3 carbon atoms and up to 6 fluorine atoms in the presence of an organic peroxide initiator at a temperature of from about 50° C. to 140° C.; and
   (B) combining the reaction product with (iii) a vinyl-functional polymeric crosslinking agent, and (iv) an organic peroxide initiator.

27. A curable composition as defined in claim 26, wherein said reaction product has the formula:

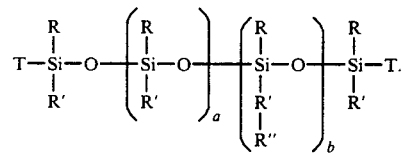

wherein R is a monovalent hydrocarbon radical of from 1 to 8 carbon atoms free of aliphatic unsaturation; R' is a monovalent hydrocarbon or halo-hydrocarbon radical of from 1 to 8 carbon atoms, R″ is a monomeric or polymeric group derived from said unsaturated fluorocarbon or mixture of unsaturated fluorocarbons grafted to the organic radicals represented by R', T is selected from the group consisting of hydrogen, hydroxy, monovalent hydrocarbon or oxyhydrocarbon radicals of from 1 to 8 carbon atoms free of aliphatic unsaturation and vinyl, and a+b is equal to from 10 to 3700.

28. The curable composition of claim 27, wherein said unsaturated fluorocarbon has from 1 to 4 fluorine atoms.

29. The curable composition of claim 28, wherein the unsaturated fluorocarbon is vinylidene fluoride.

30. The curable composition of claim 27, wherein the vinyl-functional crosslinking agent is selected from the group consisting of dimethylvinyl-chainstopped linear polydimethylsiloxane, dimethylvinyl-chainstopped polydimethyl-methylvinylsiloxane copolymer, vinyl methyl cyclotetrasiloxane, tetramethyldivinyldisiloxane, and mixtures thereof; and the organic peroxide initiator is selected from the group consisting of t-butyl hydroperoxide, cumene hydroperoxide, decaline hydroperoxide, di-t-butyl peroxide, dicumyl peroxide, 2,5-dimethyl-2,5-di-(t-butyl peroxy)hexane, ascaridole, 1,5-dimethylhexane-1,5-peroxide, t-butylperbenzoate, t-butylperoxyisopropylcarbonate and t-butylperoctoate.

31. A solid article comprising the cured composition defined in claim 1.

32. A solid article comprising the cured composition defined in claim 26.

* * * * *